March 28, 1950
E. B. FEHR ET AL
2,502,136
METHOD OF MEASURING THORIUM
IN THORIATED TUNGSTEN
Filed Jan. 4, 1949
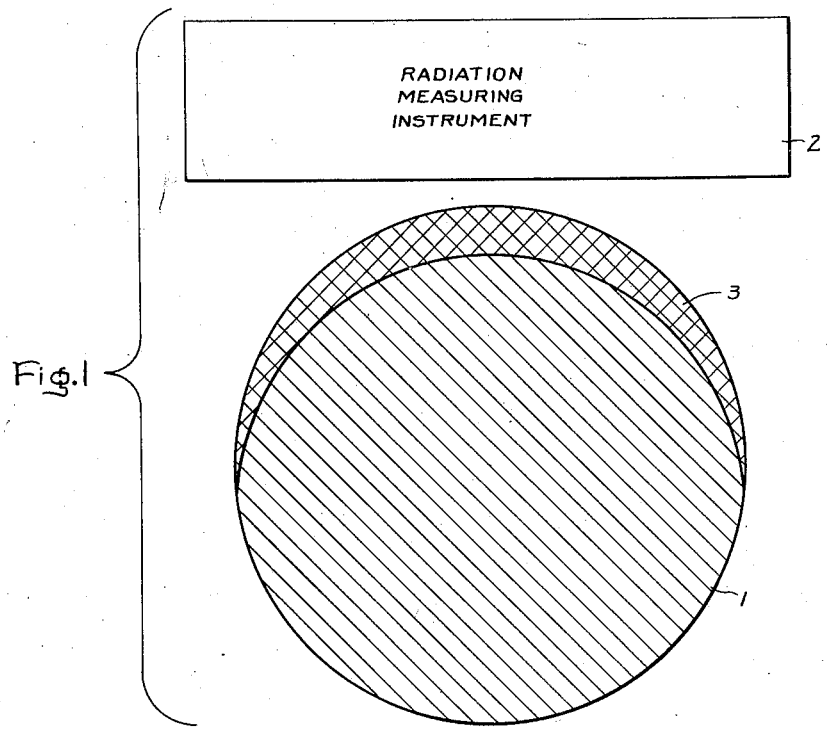
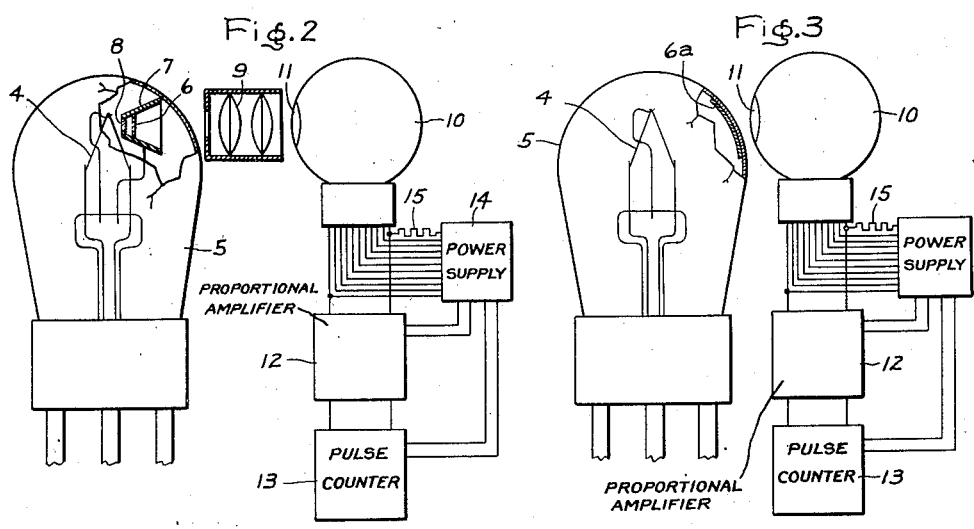
Inventors
Edith B. Fehr
Warner W. Schultz
by Richard E. Hosley
Their Attorney Patented Mar. 28, 1950

2,502,136

UNITED STATES PATENT OFFICE 2,502,136

METHOD OF MEASURING THORIUM IN THORIATED TUNGSTEN

Edith B. Fehr and Warner W. Schultz, Schenectady, N. Y., assignors to General Electric Company, a corporation of New York Application January 4, 1949, Serial No. 69,176

11 Claims. (Cl. 250—83.6)

This invention relates to an improved method for determining the amount and distribution of radioactive matter in a sample of material containing such matter along with relatively non-radioactive matter, and in particular to an improved method for determining the amount and distribution of thorium in thoriated tungsten wire.

In the manufacture of thoriated tungsten filament wire for use in thermionic tubes, both the amount and the distribution of thorium in the wire must be carefully controlled if optimum characteristics of the wire are to be obtained. Relatively small variations in thorium content may cause significant changes in the electrical and metallurgical characteristics of the wire. Heretofore, thorium determination has been done chiefly by chemical analysis, which is relatively slow and difficult.

The distribution of the thorium is important because only that portion of the thorium which is at the surface of the wire is effective in increasing the thermionic emission of electrons from the wire. Thoriated tungsten filaments are usually activated after the tube is assembled and evacuated, by heating the filament to temperatures higher than normal operating temperature for a considerable time. During this activation or "flashing" process, tungsten diffuses to the surface of the wire and some evaporates. The amount of tungsten which accumulates on the surface depends upon the relative rates of diffusion and evaporation, which depend in turn upon temperature, and the duration of the activation process. It is believed that optimum activation occurs when the surface is covered with a molecular layer of thorium. Insufficient activation results in less than maximum electron emission from the filament. Excessive activation may distribute the evaporated thorium over other tube elements, such as a grid, where its emissive properties are harmful.

During use of the tube, the supply of thorium at the surface of the filament becomes depleted, but the supply can often be replenished by a repeated activation. There has long been a need for better methods to measure thorium distribution after operation of filaments for different periods of time at various temperatures, so that the effects of different activation processes can be studied more thoroughly.

An object of this invention is to provide a simpler and more rapid method for determining the amount and the distribution of thorium in thoriated tungsten wire.

Another object is to provide an improved method for measuring the supply of thorium at the surface of a filament wire while the filament remains sealed in a vacuum tube.

Another object is to provide an improved method which is generally applicable in determining the amount and distribution of radioactive matter in a sample of material containing such matter along with relatively non-radioactive matter.

Other objects and advantages will appear as the description proceeds.

The features of the invention which are believed to be novel and patentable are pointed out in the claims forming a part of this specification. For a better understanding of the invention, reference is made in the following description to the accompanying drawing in which Fig. 1 is a schematic diagram illustrating a step in measuring the amount and distribution of thorium in a small wire, and Figs. 2 and 3 are schematic diagrams illustrating methods of measuring the supply of thorium at the surface of a filament wire sealed in a vacuum tube.

This invention takes advantage of the fact that thorium is a naturally radioactive material, while tungsten is not. Because of this, it is relatively easy to detect the presence of thorium in the tungsten wire with apparatus responsive to radiations emitted by radioactivity of the thorium.

It is well known that thorium emits three types of radiation: namely, alpha rays, beta rays, and gamma rays. These types of radiation differ greatly in their ability to penetrate material such as tungsten. The gamma rays are the most penetrating. In passing through a wire of ordinary dimensions, gamma rays undergo little attenuation. Therefore, substantially all gamma radiation emitted by thorium anywhere in the wire travels through the wire to the surface, where it may be measured by conventional radiation measuring instruments. Since the amount of gamma radiation emitted per second per unit mass of thorium is a known quantity, a measurement of the gamma radiation emitted from the wire is an indication of the total amount of thorium contained in the wire. Such a measurement can be made much more quickly and simply than a chemical analysis, and can be made to give results of at least substantially equal accuracy.

The particled radiations, alpha rays and beta rays, are much less penetrating than the gamma rays. Beta rays emitted by thorium have a maximum range in the order of one-half millimeter of tungsten. This is an average value, since particles having a considerable range of energies are emitted, but it is sufficiently accurate for some purposes. More accurate values can be computed, when needed, from published data available to those skilled in the art. Therefore, the beta rays emitted from a sample of thoriated tungsten can be considered to come from only that portion of the thorium which is within one-half millimeter of the surface facing the measuring instrument, and a measurement of these beta rays indicates the amount of thorium in a surface portion of the sample.

Alpha rays are even less penetrating. The alpha rays emitted by thorium have a penetrating power in the order of 0.02 millimeter of tungsten. Thus, a measurement of the emitted alpha particles indicates the thorium content of an extremely thin surface layer. Measurements for an even thinner surface layer can be made by interposing an air space between the sample and the alpha ray measuring instrument, since these rays have a limited range even in air. An air space of 1 cm. is equivalent to about 0.01 millimeter of tungsten in attenuating the alpha rays, and reduces by that amount the thickness of the surface portion of the sample within which thorium content is measured.

The difference in penetrating power in the three types of radiations makes possible an accurate determination of the distribution of thorium between the surface and the interior portions of a thoriated tungsten sample. A gamma ray measurement indicates the total amount of thorium in all parts of the sample, a beta count indicates the amount of this thorium contained in a surface portion, and an alpha count indicates the amount of thorium in a very thin surface layer.

Referring now to Fig. 1 of the drawing, the circle 1 represents a cross-section of a thoriated tungsten filament wire about 0.2 millimeter in diameter. A radiation measuring instrument 2 is positioned to measure radiations emitted from the wire by radioactivity of the thorium. If instrument 2 is a type adapted to measure beta radiations or gamma radiations, preferably the latter, radiation from thorium in all parts of the wire reaches the instrument, and the measurement obtained is an indication of the total thorium content of the wire. But if instrument 2 is of a type responsive to alpha radiations only, the radiation measured is that emitted by thorium in the double cross-hatched portion 3, since alpha rays from other portions of the wire would have to penetrate more than 0.02 millimeter of tungsten to reach the measuring instrument and so are absorbed within the wire. The measurement of alpha radiations is therefore an indication of the amount of thorium in surface portion 3 of the wire; and a comparison of the two measurements, with the different volumes of wire from which radiations are received in each case considered, indicates the distribution of thorium between surface and interior portions of the wire.

For a small thoriated-tungsten filament wire, as illustrated, an alpha count and a gamma ray measurement is the preferred combination for obtaining information as to both the amount and the distribution of thorium in the wire. For samples having other sizes and constituents, different combinations of the radiations available for measurement may give better results. In any particular case, the best choice will be determined by the energies of the respective types of rays emitted by the radioactive constituent, the degree to which such rays are absorbed by the material of the sample, the dimensions of the sample, and the portions of the sample to be studied. In some cases, it may be desirable to measure all types of radiation emitted. Also, a radiation measurement may be combined with other types of analysis. For example, the total thorium content of a wire can be obtained by chemical analysis, and the distribution determined by an alpha count which indicates how much of this thorium is in a surface portion of the wire.

The thorium distribution can be indicated conveniently by means of ratios between the various types of radiation measurements. For example, suppose that alpha ray and gamma ray measurements are made using a wire in which the thorium is known to be uniformly distributed between surface and interior portions of the wire. A ratio may be obtained between the alpha ray and gamma ray measurements corresponding to this known distribution. Then if like measurements are made on a wire of the same size which is similar except that the thorium distribution is unknown, and it is found that the ratio of alpha rays measured to gamma rays measured for this second wire is twice the ratio corresponding to a uniform distribution, then the unknown distribution must be such that there is twice as much thorium in the surface portion of the wire as would be present if the thorium distribution were uniform. This method has the advantage that the ratios can be determined without computing the volume from which measured alpha rays originate relative to the total volume of the wire, since both wires are the same size and shape and the geometry of the measurement setup is the same in both cases.

Refer now to Fig. 2, which is a schematic diagram illustrating the measurement of thorium at the surface of the filament wire, while the wire is sealed inside an evacuated vacuum tube envelope. In this way measurement can be made on the wire while it is maintained at high temperature by electric current; for example, measurements can be made on the wire during a typical flashing process without interrupting the process to make the measurements. The filament wire 4 is supported inside vacuum tube 5 in a conventional manner. A bit of phosphor 6 is mounted within a shield 7 having a thin window 8 positioned near the filament. Window 8 is sufficiently thin to be penetrated by a substantial number of the alpha particles emitted by radioactive thorium at the surface of the wire, but is opaque and thereby reduces undesired signals produced by other media such as visible light and low velocity electrons thermionically emitted by the filament. To more completely exclude unwanted light, shield 7 may extend through a glass seal in the wall of the vacuum tube envelope.

As each alpha particle strikes the phosphor, a flash of light is produced. By counting these flashes, an indication is obtained of the alpha particle emission of the wire, and hence of the thorium supply at the surface of the wire.

Light from the phosphor is collected by lens system 9 and focused on the cathode of photomultiplier tube 10. If desired, the lens system can be omitted and the photomultiplier tube placed close to the vacuum tube envelope. To exclude unwanted light, the envelope of the photomultiplier is opaque except for transparent window 11, or a shield may be placed about the photomultiplier tube. Each flash of light resulting from an alpha particle striking the phosphor produces a short pulse in the electrical output of the photomultiplier tube. These pulses are amplified by proportional amplifier 12 and counted by pulse counter 13. Power supply 14 provides operating voltages for the photomultiplier tube and the pulse counter. Resistor 15 constitutes the photomultiplier anode load impedance.

Flashes of light are produced when alpha particles, beta particles, or gamma ray photons strike phosphor 6. However, the alpha particles produce flashes which are brighter than those produced by the other rays, and thus produce larger pulses in the output circuit of photomultiplier tube 10. The proportional amplifier, which may be of a conventional type used in alpha count work, amplifies the larger pulses by the greater amount, and is adjusted so that only pulses which result from alpha particles have sufficient amplitude to operate pulse counter 13.

This apparatus may be used as follows: The apparatus is set up with a filament wire 4 having a known supply of thorium at its surface. For example, wire 4 may be one which has not been previously activated and has its thorium content uniformly distributed throughout its volume. The number of counts registered by pulse counter 13 is noted for a fixed period of time—5 minutes for example. After subtracting the "background" count, which is previously determined with no radioactive material present, this gives a reference count for a 5 minute interval corresponding to a known supply of thorium at the surface of the wire. Without disturbing the measurement setup, electric current may be applied to the filament wire to heat it to any desired temperature; and at any time during the process, a determination of the supply of thorium at the surface of the wire can be made by noting the number of counts registered by pulse counter 13 during a given time interval and comparing this with the standard count previously obtained.

The apparatus may be simplified if the above method is modified by taking measurements only when the filament is cool, so that shielding against visible light emitted by the hot filament is not necessary. Usually there is no disadvantage in doing this. The filament is heated for any desired length of time, then the power is turned off and the filament is allowed to cool to a temperature at which no light is emitted. A measurement is then made to determine the thorium distribution. The filament remains sealed in the vacuum tube, so that after the measurement is made the filament can be heated again for further activation if desired. Simplified apparatus for carrying out this method is illustrated schematically in Fig. 3.

Referring now to Fig. 3, filament 4 is mounted in an evacuated vacuum tube envelope 5. Phosphor 6a may be coated on the inside surface of envelope 5. Since the tube is evacuated, there is substantially no attenuation of the alpha rays in passing from the filament to the phosphor. Photomultiplier tube 10 is positioned with transparent window 11 adjacent the phosphor-coated portion of envelope 5. As each alpha particle strikes the phosphor, a flash of light is produced. Responsive to these flashes of light, the photomultiplier tube produces pulses of voltage across resistor 15, which are amplified by proportional amplifier 12 and counted by pulse counter 13.

Although these methods are especially applicable to the problem of measuring thorium in thoriated tungsten wire, they can also be applied generally to the measurement of radio-active matter in samples of material containing such matter along with relatively non-radioactive matter. Both constituents may be somewhat radioactive, provided that one constituent is sufficiently more prolific in its emission of at least one type of radiation to permit a reasonably accurate quantitative determination of its presence from the amount of such radiation.

Having described the principle of this invention and the best mode in which we have contemplated applying that principle, we wish it to be understood that the apparatus described is illustrative only, and that other means can be employed without departing from the true scope of the invention defined by the following claims.

What we claim as new and desire to secure by Letters Patent of the United States is:

1. The method of determining the distribution of radioactive matter in a sample of material containing such matter along with relatively non-radioactive matter by separately measuring at least two types of radiation emitted by radioactivity from the sample, one such type of radiation having sufficient penetrating power to penetrate substantially the entire thickness of the sample and another such type of radiation having power to penetrate only surface portions of the sample, to determine a ratio between such types of radiation for comparison with ratios corresponding to known distributions of the radioactive matter.

2. The method of determining the distribution of radioactive matter in a sample of material containing such matter along with relatively non-radioactive matter by separately measuring gamma radiation and at least one type of particled radiation emitted by radioactivity from the sample, such gamma radiation having sufficient penetrating power to penetrate substantially the entire thickness of the sample and such particled radiation having power to penetrate only surface portions of the sample, to determine a ratio between the particled radiation and the gamma radiation for comparison with similar ratios obtained from samples having known distributions of the radioactive matter.

3. The method of determining the distribution of radioactive matter in a sample of material containing such matter along with relatively non-radioactive matter by separately measuring alpha radiation and gamma radiation emitted from the sample such gamma radiation having sufficient penetrating power to penetrate substantially the entire thickness of the sample and such alpha radiation having power to penetrate only surface portions of the sample, to determine a ratio between the alpha radiation and the gamma radiation for comparison with similar ratios obtained from samples having known distributions of the radioactive matter.

4. The method of determining the distribution of radioactive matter in a sample of material containing such matter along with relatively non-radioactive matter by separately measuring beta radiation and gamma radiation emitted from the sample, such gamma radiation having sufficient penetrating power to penetrate substantially the entire thickness of the sample and such beta radiation having power to penetrate only surface portions of the sample, to determine a ratio between the beta radiation and the gamma radiation for comparison with similar ratios obtained from samples having known distributions of the radioactive matter.

5. The method of determining the distribution of radioactive matter in a sample of material containing such matter along with relatively non-radioactive matter by separately measuring alpha radiation and beta radiation emitted from the sample, such beta radiation having sufficient penetrating power to penetrate substantially the entire thickness of the sample and such alpha radiation having power to penetrate only surface portions of the sample, to determine a ratio between the alpha radiation and the beta radiation for comparison with similar ratios obtained from samples having known distributions of the radioactive matter.

6. The method of determining the distribution of thorium in thoriated tungsten wire by separately measuring at least two types of radiation emitted by radioactivity from the wire one such type of radiation having sufficient penetrating power to penetrate substantially the entire thickness of the wire and another such type of radiation having power to penetrate only surface portions of the wire, to determine a ratio between such types of radiation for comparison with ratios corresponding to known distribution of the thorium.

7. The method of determining the distribution of thorium in thoriated tungsten wire by separately measuring alpha radiation and gamma radiation emitted from the wire, said gamma radiation having sufficient penetrating power to penetrate substantially the entire thickness of the wire and such alpha radiation having power to penetrate only surface portions of the wire, to determine a ratio between the alpha radiation and the gamma radiation for comparison with similar ratios obtained from wires having known distributions of thorium.

8. The method of measuring the supply of thorium at the surface of a thoriated tungsten filament wire sealed in a vacuum tube which comprises placing a phosphor within the tube and counting the light flashes produced by alpha particles emitted by the filament striking the phosphor.

9. The method of determining the distribution of radioactive matter in a sample of relatively non-radioactive matter, comprising determining by any means the total amount of such radioactive matter contained in such sample, and determining the amount of such radioactive matter in surface portions of such sample by measuring radiations emitted therefrom by radioactivity, the radiations measured having power to penetrate only surface portions of the sample.

10. The method of determining the distribution of thorium in thoriated tungsten wire, comprising determining by any means the total amount of thorium in such wire, and determining the amount of thorium in surface portions of such wire by measuring alpha radiation emitted from the wire by radioactivity of the thorium.

11. The method of measuring changes in the distribution of thorium in a thoriated tungsten filament during activation of the filament, comprising placing the thoriated tungsten filament within an evacuated envelope, heating said filament to activate it, and at a plurality of different times during such heating measuring the alpha radiation emitted from said filament.

EDITH B. FEHR.
WARNER W. SCHULTZ.

REFERENCES CITED

The following references are of record in the file of this patent:

UNITED STATES PATENTS

| Number | Name | Date |
|---|---|---|
| 2,330,829 | Lundberg | Oct. 5, 1943 |
| 2,365,553 | Hill | Dec. 19, 1944 |
| 2,368,486 | Mullane | Jan. 30, 1945 |